United States Patent
Chen et al.

(10) Patent No.: US 8,767,100 B2
(45) Date of Patent: *Jul. 1, 2014

(54) COLOR IMAGE SENSOR ARRAY WITH COLOR CROSSTALK TEST PATTERNS

(71) Applicant: Taiwan Semiconductor Manufacturing Co., Ltd., Hsin-Chu (TW)

(72) Inventors: Calvin Yi-Ping Chen, Taipei (TW); Honyih Tu, Hsinchu (TW); Kuo-Yu Chou, Hsinchu (TW); Po-Sheng Chou, Baoshan Township (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/723,262

(22) Filed: Dec. 21, 2012

(65) Prior Publication Data
US 2013/0113958 A1  May 9, 2013

Related U.S. Application Data

(63) Continuation of application No. 12/909,154, filed on Oct. 21, 2010, now Pat. No. 8,350,934.

(51) Int. Cl.
*H04N 9/64* (2006.01)
*H04N 17/02* (2006.01)

(52) U.S. Cl.
USPC .................... 348/242; 348/187; 348/251

(58) Field of Classification Search
USPC ......... 348/242, 187, 251, 188, 241, 248, 272, 348/273
See application file for complete search history.

(56) References Cited

U.S. PATENT DOCUMENTS

| 7,215,361 B2 | 5/2007 | Duesman et al. |
| 7,400,352 B1 | 7/2008 | Luo |
| 7,456,878 B1 | 11/2008 | Sun et al. |
| 7,561,194 B1 | 7/2009 | Luo |
| 8,471,921 B1* | 6/2013 | Li .................. 348/222.1 |
| 8,531,558 B2* | 9/2013 | Kikuchi et al. ............ 348/241 |
| 2001/0043274 A1 | 11/2001 | Shepherd et al. |

(Continued)

FOREIGN PATENT DOCUMENTS

| JP | 10271519 A | * 10/1998 |
| JP | 2006121164 A | * 5/2006 |

(Continued)

OTHER PUBLICATIONS

Theuwissen, A., "Image Processing Chain in Digital Still Cameras", Symposium on VLSI Circuits Digest of Technical Papers, 2004, pp. 2-5.

*Primary Examiner* — John Villecco
(74) *Attorney, Agent, or Firm* — Duane Morris LLP; Steven E. Koffs

(57) ABSTRACT

An integrated circuit comprises a semiconductor substrate and a color image sensor array on the substrate. The color image sensor array has a first configuration of color pixels for collecting color image data, and at least one crosstalk test pattern on the substrate proximate the color image sensor array. The crosstalk test pattern includes a plurality of color sensing pixels arranged for making color crosstalk measurements. The test pattern configuration is different from the first configuration.

20 Claims, 16 Drawing Sheets

(56) References Cited

U.S. PATENT DOCUMENTS

| | | |
|---|---|---|
| 2006/0054939 A1 | 3/2006 | Hsu et al. |
| 2006/0098868 A1 | 5/2006 | Fainstain et al. |
| 2006/0237755 A1 | 10/2006 | Duesman et al. |
| 2008/0055446 A1* | 3/2008 | Hunter et al. .................. 348/308 |
| 2008/0259180 A1* | 10/2008 | Ovsiannikov .............. 348/225.1 |
| 2010/0039530 A1 | 2/2010 | Guo et al. |
| 2011/0031418 A1 | 2/2011 | Shcherback et al. |
| 2011/0058072 A1* | 3/2011 | Wang et al. ..................... 348/242 |
| 2011/0102635 A1 | 5/2011 | Fukunaga et al. |
| 2011/0134288 A1 | 6/2011 | Kasai |
| 2011/0273569 A1 | 11/2011 | Douady et al. |
| 2012/0147230 A1 | 6/2012 | Vaillant et al. |
| 2012/0206635 A1* | 8/2012 | Kikuchi et al. ............... 348/308 |
| 2012/0212657 A1 | 8/2012 | Mo et al. |
| 2013/0135500 A1* | 5/2013 | Theuwissen .................. 348/242 |

FOREIGN PATENT DOCUMENTS

| | | | |
|---|---|---|---|
| JP | 2008113236 A | | 5/2008 |
| JP | 2011014966 A | * | 1/2011 |
| JP | 2012147334 A | * | 8/2012 |
| KR | 2007066760 A | | 6/2007 |
| WO | WO 2010001811 A1 | * | 1/2010 |

* cited by examiner

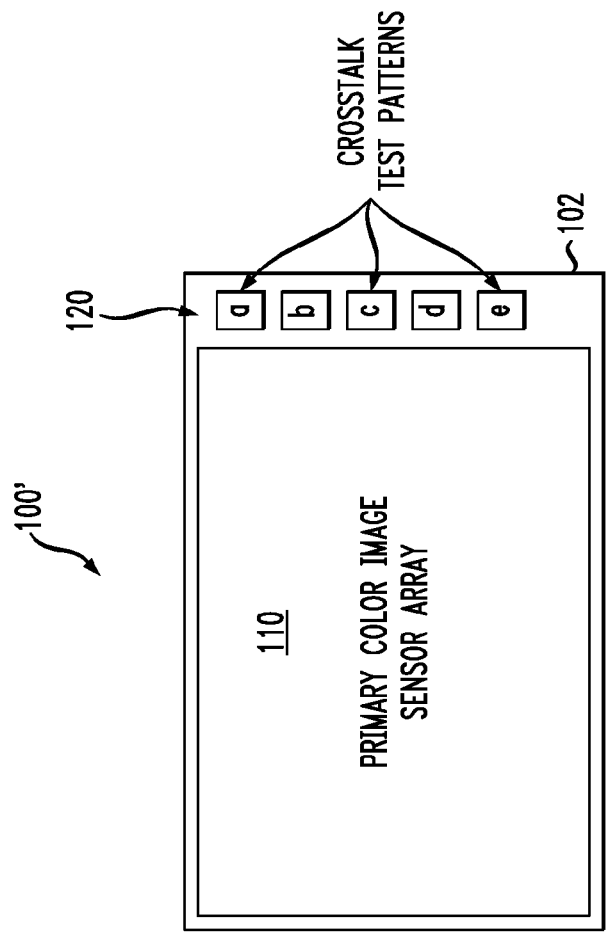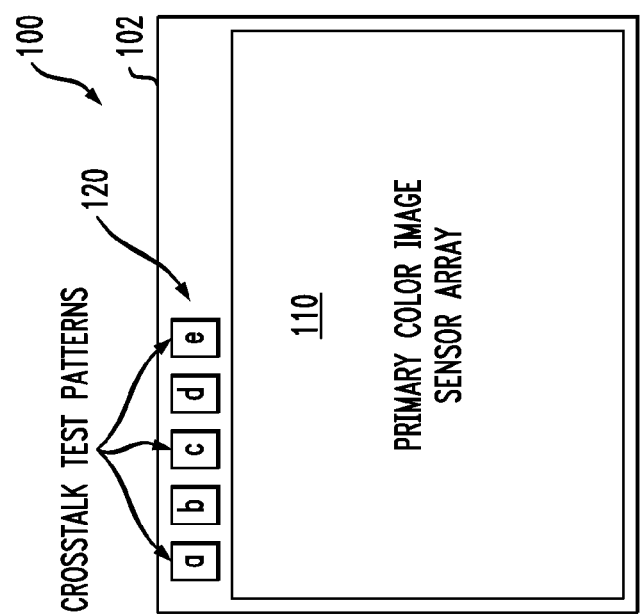

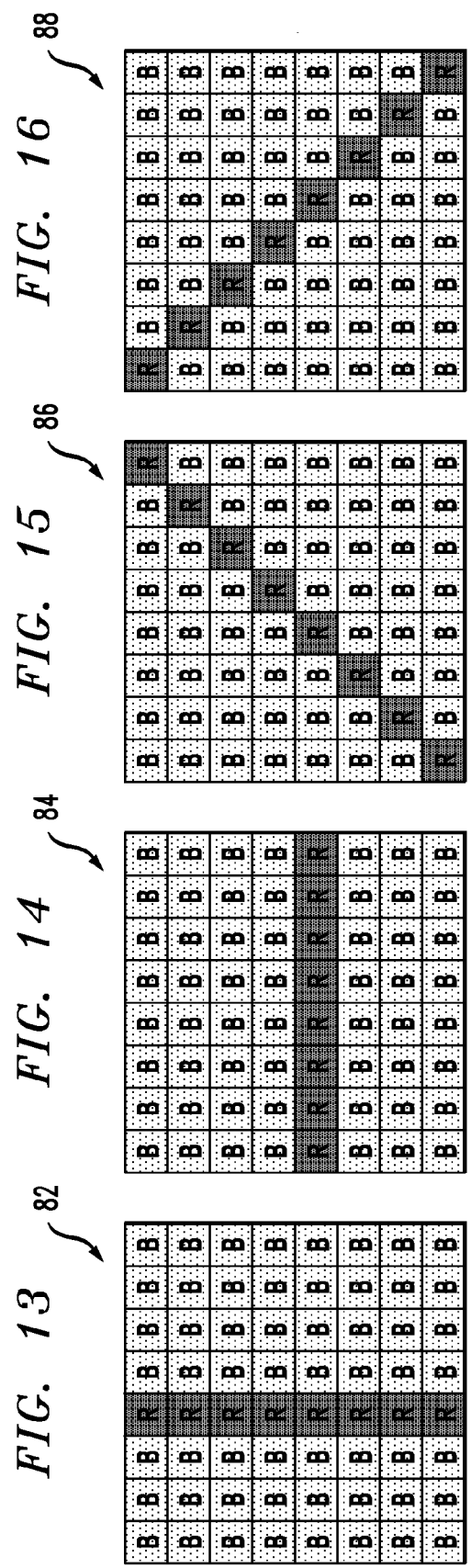

| B | W | G | W |
|---|---|---|---|
| W | B | W | G |
| G | W | R | W |
| W | G | W | R |

| B | W | G | W |
|---|---|---|---|
| W | R | W | G |
| G | W | B | W |
| W | G | W | R |

| G | G | G | G |
|---|---|---|---|
| G | R | G | B |
| G | G | G | G |
| G | B | G | R |

| R | G | R | G |
|---|---|---|---|
| W | B | W | B |
| R | G | R | G |
| W | B | W | B |

| B | G | R | G |
|---|---|---|---|
| W | W | W | W |
| G | R | G | B |
| W | W | W | W |

| B | G | B | G |
|---|---|---|---|
| W | W | W | W |
| G | R | G | R |
| W | W | W | W |

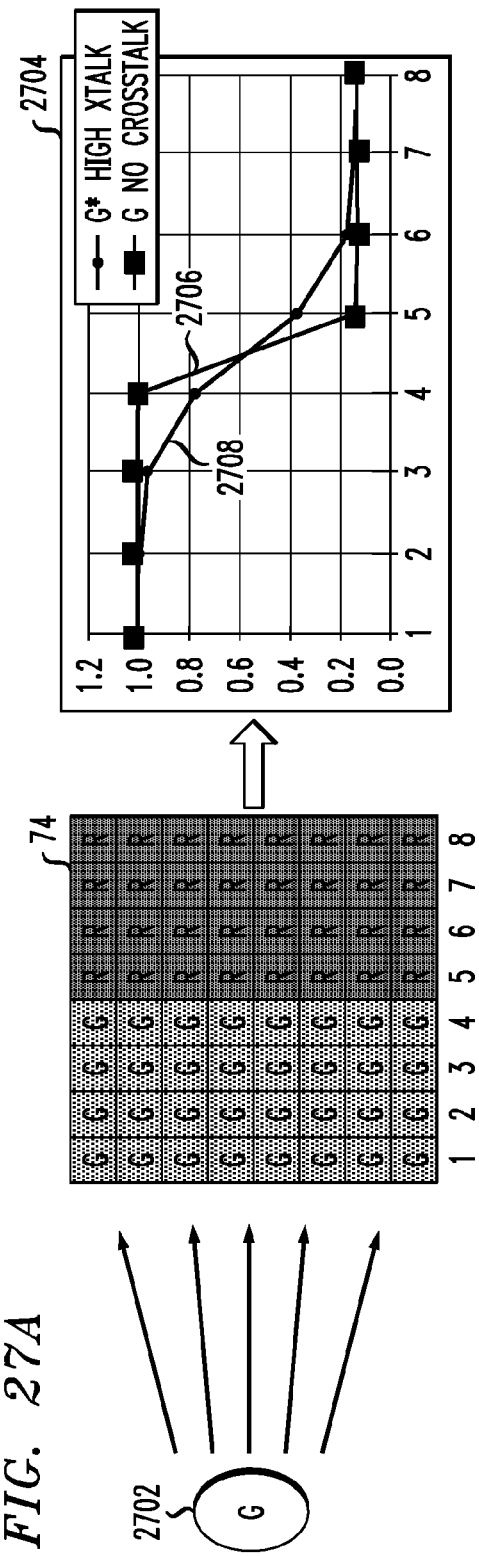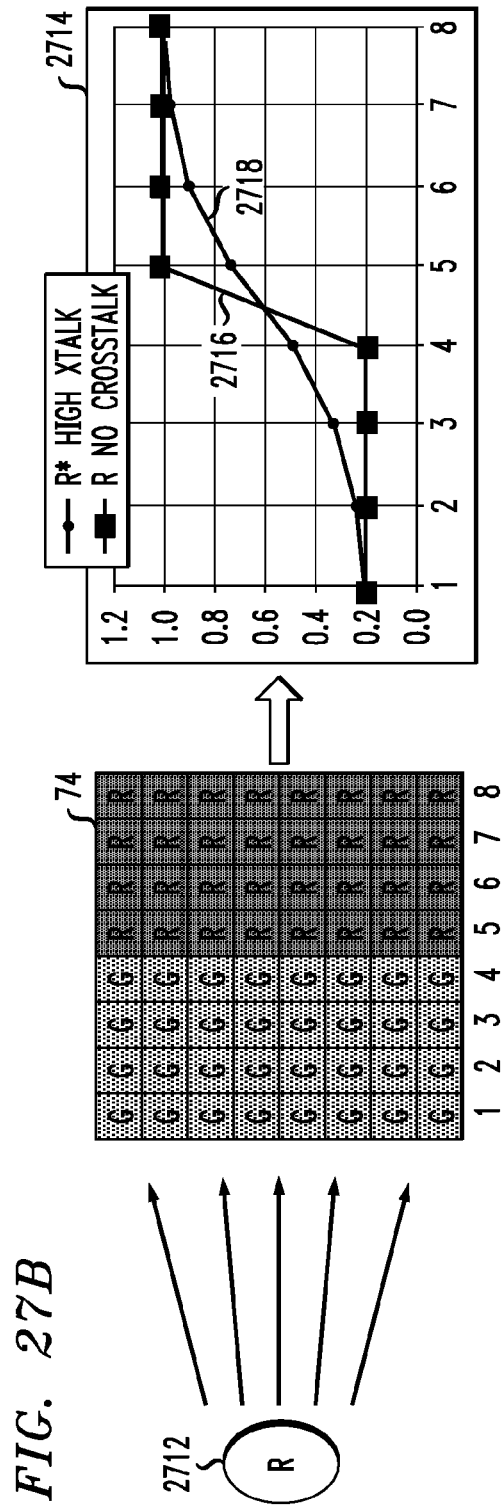
FIG. 27A
FIG. 27B

COLOR IMAGE SENSOR ARRAY WITH COLOR CROSSTALK TEST PATTERNS

This application is a continuation of U.S. patent application Ser. No. 12/909,154, filed Oct. 21, 2010, which is expressly incorporated herein by reference in its entirety.

FIELD

This disclosure relates generally to semiconductor devices and fabrication methods, and more specifically to color image sensors and their fabrication.

BACKGROUND

Color image sensors are used in a variety of electronic devices which capture color image data and convert the optical image to electrical signals. For example, color image sensors are commonly used in digital cameras, including standalone still image and video cameras, as well as multi-function devices with camera functions, such as cellular phones, smart phones, personal digital assistants, web cams, laptop computers, and the like. The term "camera", as used herein refers to any such electronic imaging device.

A common form of color image sensor has an array of picture elements (pixels), each covered by a respective color filter. For example, the color filters may be arranged in a Bayer pattern, having alternating red-green and green-blue rows. The red filters pass red light and ideally block blue and green light. The green filters pass green light and ideally block blue and red light. The blue filters pass blue light and ideally block red and green light.

However, a variety of factors may result in crosstalk between neighboring colored pixels and between colors. For example, spectral crosstalk may result from imperfect blocking of green or blue light by a red filter, imperfect blocking of red and blue light by a green filter, or imperfect blocking of red and green light by a blue filter. Optical crosstalk occurs when a given pixel receives light that should ideally only reach a nearby pixel. This may occur, for example, if the incoming light has a non-perpendicular light incidence angle. Other sources of optical cross talk include light scattering and reflection at color filter array (CFA) and micro-lens boundaries, interconnect metal wires, and light diffraction due to the small size of each color filter pitch. Additionally, there is electrical cross talk, caused by photo-carrier diffusion in the silicon substrate beneath pixels of different colors.

Color crosstalk results in degradation of sensor spatial resolution. Color information on one pixel is contaminated by information of its neighbors. This results in degradation of color fidelity.

BRIEF DESCRIPTION OF THE DRAWINGS

FIGS. 1A and 1B show two examples of integrated circuits (IC's) having color crosstalk test patterns proximal to the primary color image sensor array.

FIGS. 13 to 16 are diagrams of test patterns having a single column, row, or diagonal of a first color surrounded by a second color.

FIGS. 17 and 18 are diagrams of test patterns having alternating columns or rows of two colors.

FIGS. 27A and 27B show an example of test data from collected from green and red monochrome light sources, respectively.

DETAILED DESCRIPTION

Figure 2:
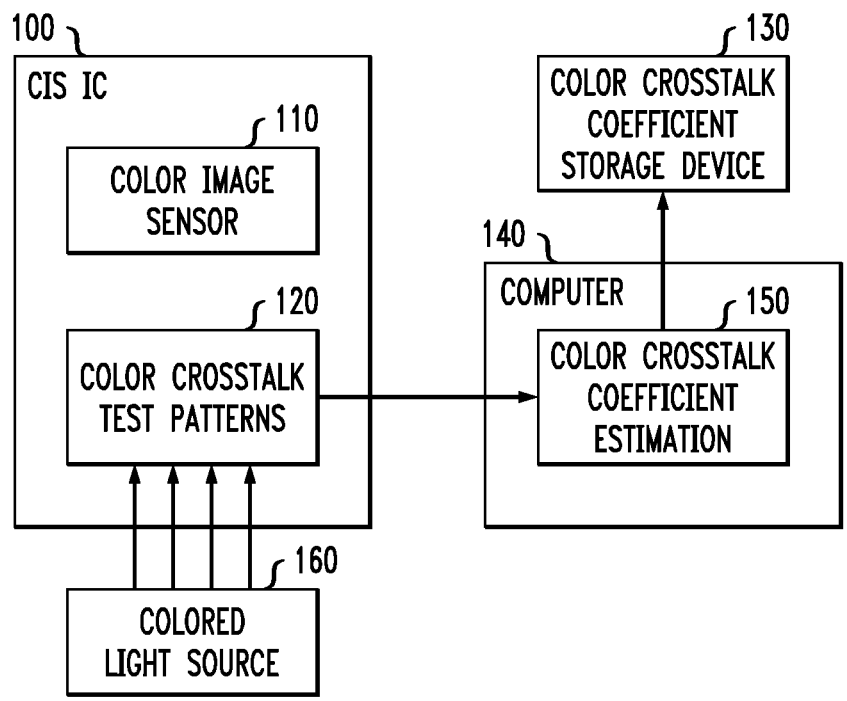
FIG. 2 is a block diagram of apparatus for generating color crosstalk correction coefficients including an IC as shown in FIG. 1A or 1B.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

In some embodiments, a method and apparatus correct the pixel-to-pixel crosstalk in color image sensors. Referring to FIGS. 1A and 1B, a suite of color-filter-based test patterns 120 are embedded on-chip in the same integrated circuit 100 or 100' that includes the color image sensor 110. The color-filter-based test patterns 120 are proximate to the color image sensor, also referred to herein as the primary pixel array. The pixels of the test patterns have identical structures to the pixels of the primary array in every aspect, such as the active transistor layout and the interconnect metal wires, except the color filters. A set of parameters characterizing the pixel-to-pixel crosstalk are extracted from the measurement results on the test patterns 120. The set of crosstalk parameters are used in crosstalk correction as a part of the image signal processing (ISP) procedures performed either on-chip or off-chip, by either hardware or software.

FIGS. 1A and 1B show two examples of an integrated circuit 100, 100', comprising: a semiconductor substrate 102, a color image sensor array 110 on the substrate, and at least one color crosstalk test pattern 120 on the substrate 102 proximate the color image sensor array.

The substrate 102 may be a silicon substrate, or other semiconductor substrate suitable for forming a color image sensor. In some embodiments, the substrate is transparent, to permit back-side illumination of the sensors. In some embodiments, the substrate is neither completely transparent nor completely opaque. Part of the light is absorbed and part of it passes through, depending on the absorption coefficient and the thickness of the substrate. Some embodiments have front-side illuminated (FSI) sensors, and others have back-side illuminated (BSI) sensors. For FSI sensors, part of the incoming light is blocked by front-side metal wires and the transistors within each pixel. The so-called fill-factor is much less than 100%. For BSI sensors, the fill-factor can be very close to 100%. The wafer is thinned from several hundreds of microns to a few microns such that the light can reach the photodiode p-n junction before absorbed and attenuated in the thick substrate.

The color image sensor array 110 has a first configuration of color pixels for collecting color image data. The photosensitive elements in the array may be complementary metal oxide semiconductor (CMOS) devices or charge coupled devices (CCD). Each pixel has a respective color filter over it, acting as a band pass filter to permit light of a particular color pass through. The color pixels of the color image sensor array 110 are arranged in a first configuration. In some embodiments, the color filters of the color image sensor array 110 are arranged in a Bayer pattern which alternates between rows of red-green rows and green-blue rows, so that each square of four pixels has one filtered red, one blue, and two green pixels. A Bayer pattern is advantageous in color image sensors, because the human eye is more sensitive to green light than to red or blue. However, other embodiments use different patterns. For example, instead of red, green and blue filters, the color image sensor array 110 may have cyan, magenta and yellow filters. Also, for any given color space (e.g., RGB) many color-filter patterns are used in the industry; some examples are shown in FIG. 26A-F. The method described herein may use any of these patterns.

The color image sensor array 110 may have any of a variety of sizes, typically determined by the type of imaging device into which the IC 100, 100' is to be installed. For example, a low resolution camera suitable for a cell phone or web cam may have a resolution of less than one megapixel, but a professional digital camera may have a resolution of 20 megapixels or more.

Figure 7:
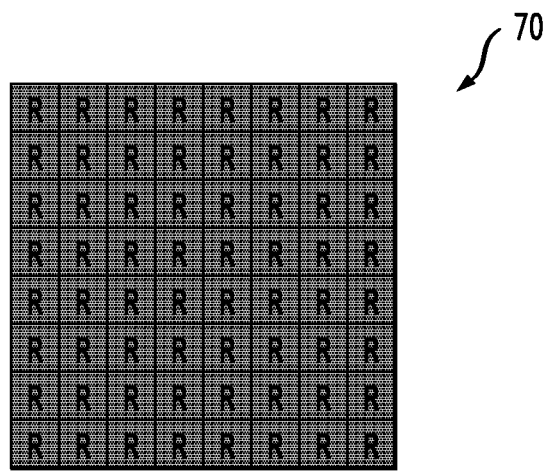
FIG. 7 is a diagram of a monochrome test pattern for collecting test data without color crosstalk.

At least one crosstalk test pattern 120 is located on the substrate 102 proximate the color image sensor array 110. The crosstalk test pattern 120 includes a plurality of color sensing pixels arranged for making color crosstalk measurements. The test pattern configuration is different from the first configuration. In some embodiments, a plurality of respectively different crosstalk test patterns 120 are provided on the substrate 102, each of the plurality of crosstalk test patterns 120 having a configuration that is different from the first configuration (of the color image sensor array 110). FIGS. 8 to 21 show non-limiting examples of test patterns that may be used alone or in any combination. FIG. 7 shows an additional monochrome test pattern that may be used as a control, for collecting light of a single frequency, so that crosstalk components in each pixel cancel each other out.

FIGS. 1A and 1B show two optional locations for the crosstalk test patterns 120, but these locations are not limiting. For example, the test patterns 120 may be located on any one, two, three or all four sides of the color image sensor array 110. The test patterns 120 are positioned proximal to the color image sensor array, so that the test patterns 120 are subjected to the same process conditions as the color image sensor array 110. To the extent that there may be any within-wafer process variations causing non-uniform material deposition, removal or treatment across the wafer, placement of the test patterns 120 proximate the color image sensor array 110 minimizes these variations between a given array 110 and its corresponding test patterns 120. Thus, each set of test patterns 120 is subjected to substantially the same process as its respective color image sensor array 110.

By providing individual sets of color crosstalk test patterns 120 for each respective color image sensor array 110, greater color fidelity can be obtained by using proper crosstalk-correction algorithms, regardless of the presence or absence of process variations that may cause within-wafer non-uniformities and/or between wafer non-uniformities.

FIG. 2 is a block diagram of an example of a system for estimating color crosstalk coefficients for correction of data from an individual color image sensor array 110. The system includes the IC 100 (or 100') of FIG. 1, or another IC having a color image sensor array 110 and another arrangement of color crosstalk test patterns 120 proximate to the array. The system further comprises a circuit 150 for estimating color crosstalk correction coefficients based on output signals from the at least one crosstalk test pattern.

In some embodiments, the color crosstalk coefficient estimation circuit is embodied in one or more modules of a computer program executed on a computer 140 external to the IC 100.

Figures 25, 26A, 26B, 26C, 26D, 26E, 26F:
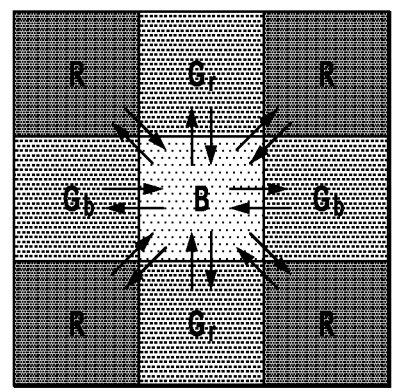
FIG. 25 is a diagram showing color crosstalk in a portion of a Bayer pattern color image sensor array.
FIGS. 26A to 26f show alternative test patterns that may be used in some embodiments.

For example, the crosstalk among nearest neighboring pixels can be described by the following first-order model. FIG. 25 shows an example of a blue pixel (B) surrounded by red (R) and green pixels. The green pixels are designated Gr if located in rows of alternating red and green filters, and are designated Gb if located in rows of alternating blue and green filters. The blue pixel (B) in FIG. 25 receives additional light due to eight crosstalk components, indicated by incoming arrows, and also causes crosstalk components received by the eight surrounding pixels, shown by the outgoing arrows. In some sensors, there may also be second order crosstalk (i.e., light sensed at pixel MN due to light impinging on pixel MN−2 or MN+2). As long as test results do not show these second order crosstalk components to substantially affect the color correction, they can be ignored. One of ordinary skill can compare the test results with any given model to determine whether the model provides a desired level of accuracy. In a case where the second order crosstalk appears to be substantial, the model presented below can readily be modified to further include the second order affects.

In the first order model, $R_{2m,2n}$ stands for the ideal R pixel at coordinates $(2m, 2n)$; $R^*_{2m,2n}$ stands for the real R pixel at coordinates $(2m, 2n)$ mixed with neighboring pixels by crosstalk.

This model is described by 3 crosstalk parameters ($a_x$, $a_y$, d).

$$R^*_{2m,2n}=(1-a_x-a_y-d)R_{2m,2n}+(a_x/2)G_{2m-1,2n}+(a_x/2)G_{2m+1,2n}+(a_y/2)G_{2m,2n-1}+(a_y/2)G_{2m,2n+1}+(d/4)B_{2m-1,2n-1}+(d/4)B_{2m+1,2n-1}+(d/4)B_{2m-1,2n+1}+(d/4)B_{2m+1,2n+1}$$

$$G^*_{2m+1,2n}=(1-a_x-a_y-d)G_{2m+1,2n}+(a_x/2)R_{2m,2n}+(a_x/2)R_{2m+2,2n}+(a_y/2)B_{2m+1,2n-1}+(a_y/2)B_{2m+1,2n+1}+(d/4)G_{2m,2n-1}+(d/4)G_{2m,2n+1}+(d/4)G_{2m+2,2n-1}+(d/4)G_{2m+2,2n+1}$$

$$*G_{2m,2n+1}=(1-a_x-a_y-d)G_{2m,2n+1}+(a_x/2)B_{2m-1,2n-1}+$$
$$(a_x/2)B_{2m+1,2n-1}+(a_y/2)R_{2m,2n}+(a_y/2)R_{2m,2n+2}+(d/4)G_{2m,1,2n}+(d/4)G_{2m-1,1,2n+2}+(d/4)G_{2m-1,2n+2}+$$
$$(d/4)G_{2m+1,2n+2}$$

$$B*_{2m+1,2n+1}=(1-a_x-a_y-d)B_{2m+1,2n+1}+(a_x/2)G_{2m,2n+1}+$$
$$(a_x/2)G_{2m,2n+1}+(a_y/2)G_{2m+1,2n}+(a_y/2)G_{2m+1,2n}+$$
$$(a_y/2)G_{2m+1,2n+2}+(d/4)R_{2m,2n}+(d/4)R_{2m,2,2n}+(d/4)R_{2m,2n+2}+(d/4)R_{2m+2,2n+2}$$

Once the crosstalk parameters are known, the original R, G, B data can be recovered, or corrected, from the crosstalk-mixed R*, G*, B* data through a mathematical process.

For example, the 2-dimensional space-domain linear transformation can be Fourier-transformed into spatial-frequency domain. The inverse of the matrix is calculated in the spatial-frequency domain and then transformed back into the space domain by inverse Fourier transform.

The final inverse transform may be approximated to involve only the nearest neighboring pixels to simplify the hardware or software calculation.

In some embodiments, a suite of color-filter based test patterns are used to extract the crosstalk parameters experimentally. A non-limiting example of such a suite is described below in the discussion of FIGS. 7-21. For example, the parameters are obtained by best-fitting the measured data from the test patterns 120 with the results predicted by the mathematical model. The parameters are to be used for crosstalk correction in the new image processing pipe.

In other embodiments, the color crosstalk coefficient estimation may be performed by an application specific integrated circuit (not shown).

Referring again to FIG. 2, during testing (e.g., wafer acceptance testing, or individual IC testing), a plurality of colored lights are applied to the color crosstalk test pattern arrays 120 from colored light sources 160 (which may be red, green and blue lasers emitting light perpendicular to the test pattern arrays 120). The color crosstalk correction coefficients are calculated in the circuit 150, as discussed above. A color crosstalk correction coefficient storage device 130 associated with the IC 100 is provided for storing the outputs of the color crosstalk correction coefficient estimation circuit 150. In some embodiments, the color crosstalk correction coefficient storage device associated with the IC 100 may comprise any non-volatile storage device accessible by the processor 140, including for example, a hard disk drive or flash memory drive. For example, in an embodiment in which the color image sensor is installed in a computer, it may be convenient to store the color crosstalk coefficients in a memory device in the computer. If the color crosstalk correction coefficients are not stored in the IC 100, then they can optionally be temporarily stored in an intermediate storage device (not shown), to be copied subsequently into a storage device in the camera, into which IC 100 is to be installed. For example, if test data are collected during wafer level testing, the signals collected from the color correction test patterns 120 may be stored in a storage device associated with the test equipment, and subsequently, the coefficients for each individual IC 100 can be stored in the respective color crosstalk correction coefficient storage device 130 associated with each individual IC 100.

Figure 3:
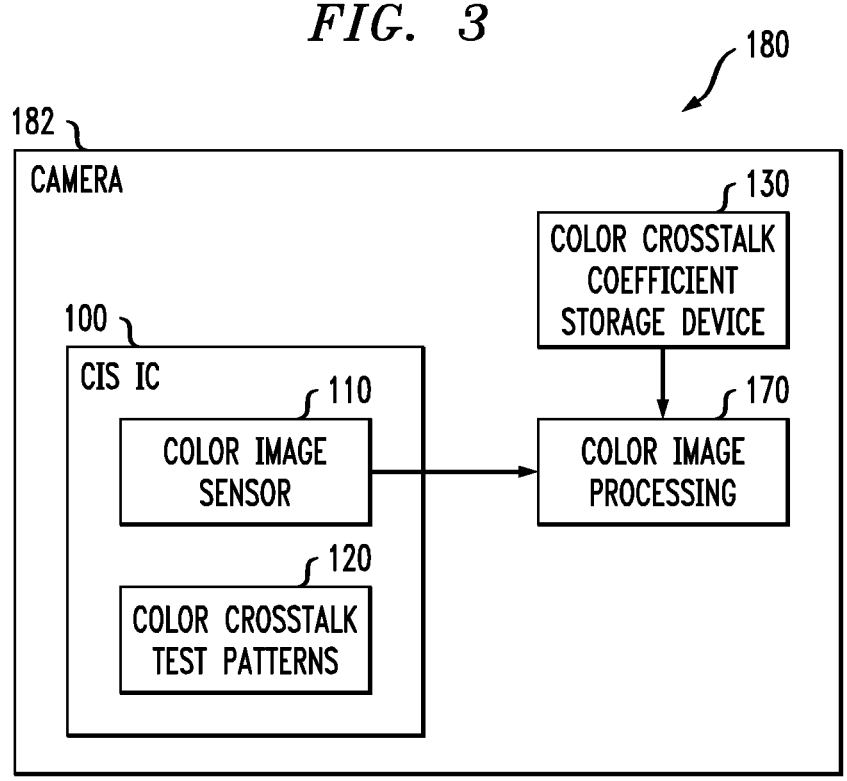
FIG. 3 is a block diagram of a camera including the IC of FIG. 2.

FIG. 3 is a block diagram of a digital camera 180, in which the IC 100 containing the color image sensor array 110, and the color crosstalk coefficient storage device 130 are installed. FIG. 3 shows the image signal processing (ISP) outside of the sensor. In the configuration of FIG. 3, the sensor 100 without an integrated ISP unit may be referred to as a "raw-data" sensor. The camera may be a standalone still image or video camera, or a multi-function device with camera functions, such as cellular phones, smart phones, personal digital assistants, web cams, laptop computers, or the like. The color image data is provided by the color image sensor array 110 to the color image processing circuit 170. The color image processing circuit 170 may be an application specific digital signal processor or a specially programmed general purpose processor.

Figure 3A:
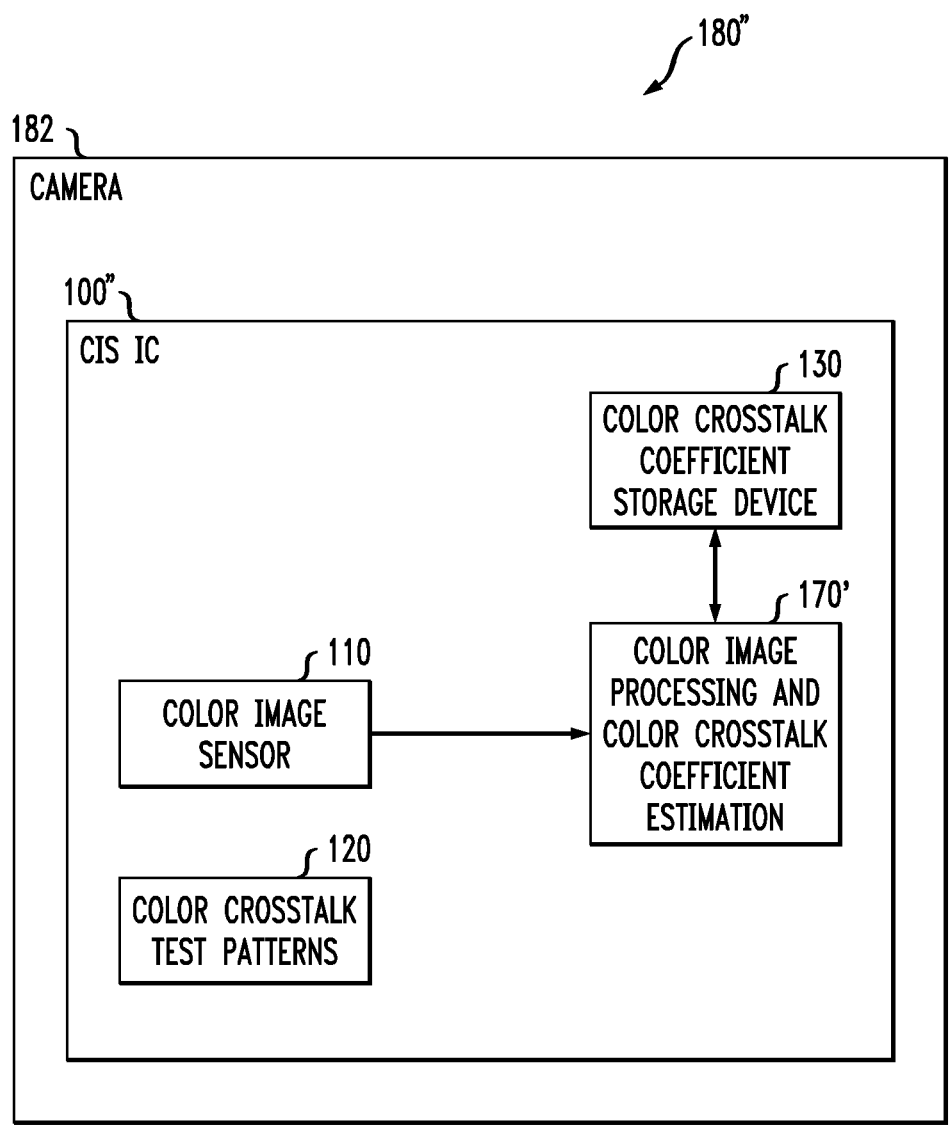
FIG. 3A is a block diagram of a camera with a variation of the sensor IC of FIG. 3.
Figure 3B:
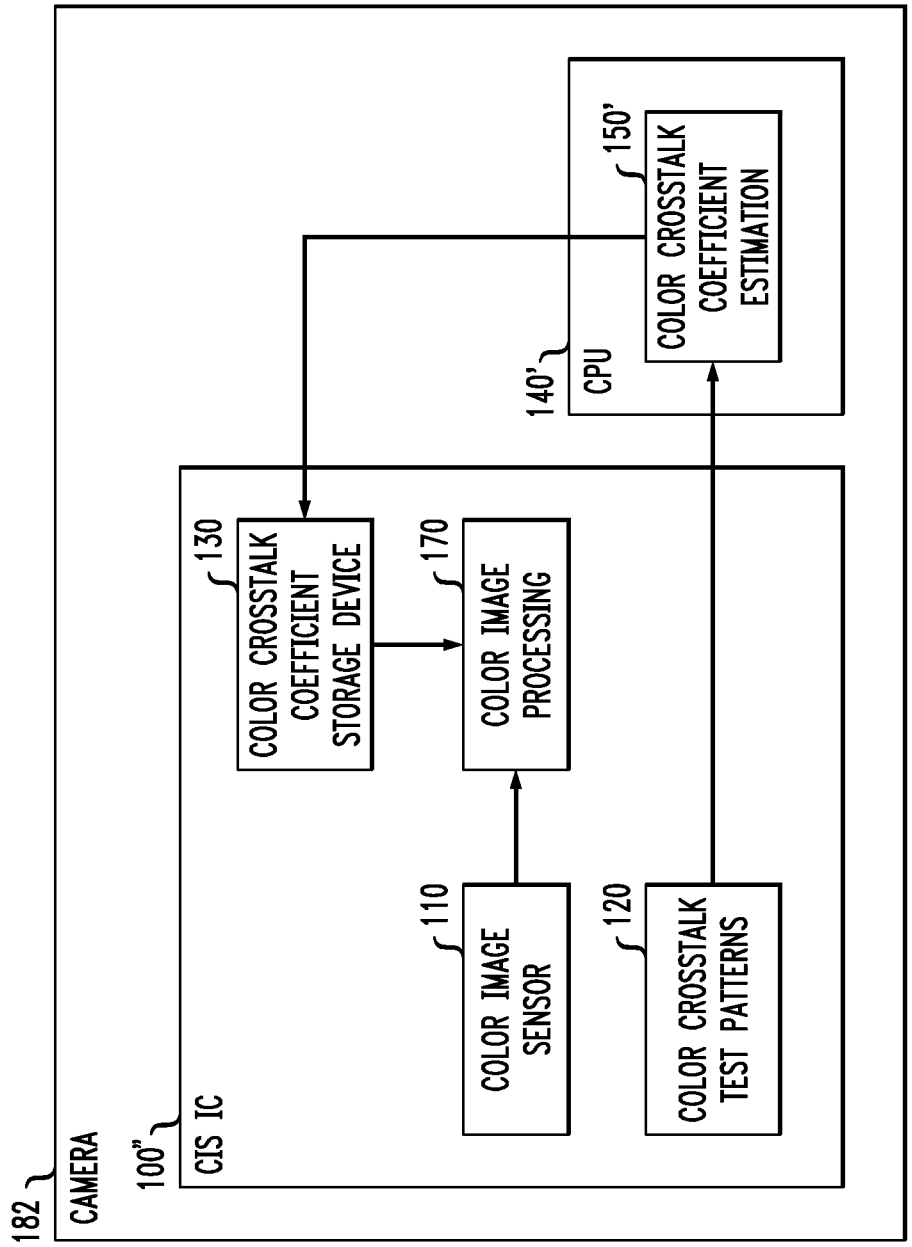
FIG. 3B is a block diagram of a camera having the sensor IC of FIG. 3A and an additional processor.

In some embodiments, as shown in FIG. 3A, the image signal processing (ISP) unit 170 is a part of the image sensor IC 100". Sensor 100" with an integrated ISP unit 170' may be referred to as a system-on-chip (SoC) sensor. Thus, FIG. 3A shows the SoC sensor 100" with integrated ISP 170'. In some embodiments (as shown in FIG. 3B, the camera 180'" includes a sensor 100" with integrated ISP unit 170 and a separate processor 140' that performs the color crosstalk coefficient estimation.

In either case, the color image processing circuit 170, 170' uses the color crosstalk coefficients to perform color crosstalk corrections. Details of the image processing are described below with reference to FIG. 6.

Figure 4:
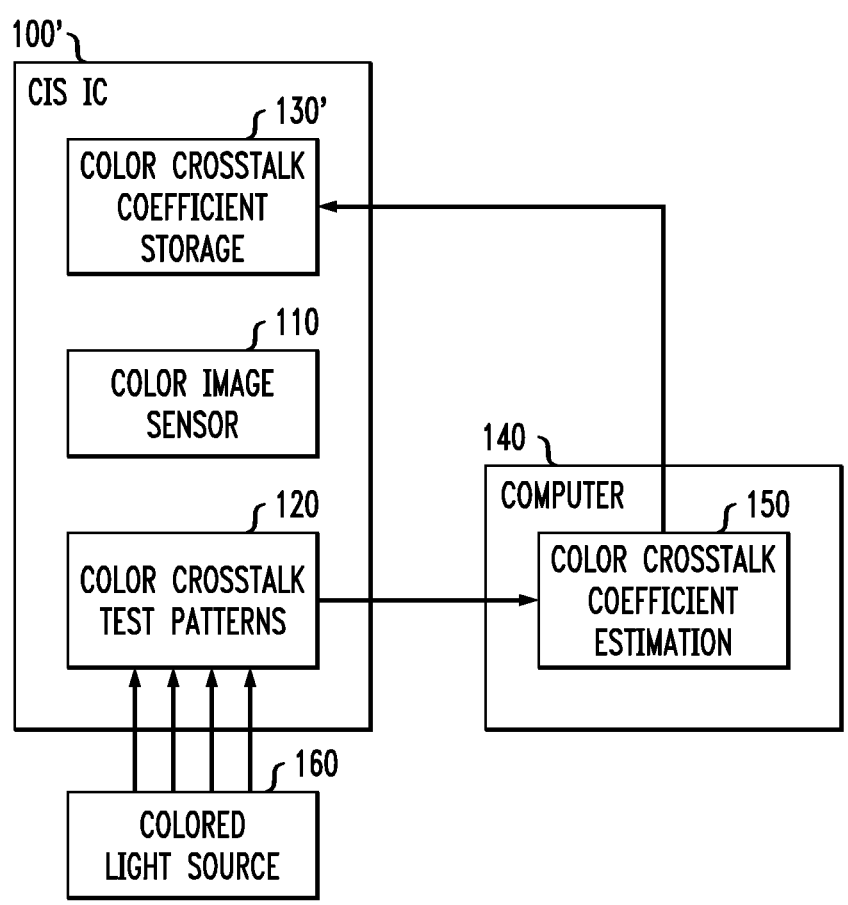
FIG. 4 is a variation of the apparatus of FIG. 2, having coefficient storage in the IC.

In other embodiments (e.g., FIGS. 4 and 5) the color crosstalk correction coefficients are stored in non-volatile memory elements (e.g., registers) 130' on the same substrate as the color image sensor array 110. The on-chip storage device may include registers, flash memory, or the like. As shown in FIG. 4, during testing, the color crosstalk test patterns 120 are exposed to light at various frequencies from colored light source(s) 160. The signals output by the test patterns 120 are exported to a color crosstalk coefficient estimation circuit 150, which may be in an external computer 140. Once the color crosstalk correction coefficients are calculated, they are returned to the on-chip storage device 130'.

FIG. 4 shows an external processor 140 configured to perform color crosstalk coefficient estimation. The color crosstalk coefficient estimation of FIG. 4 may be implemented in a variety of ways (1) In some embodiments, color crosstalk coefficient estimation is performed by a separate, computerized testing system (e.g., before the camera or sensor chip is shipped out of the factory) as shown in FIG. 2, the coefficients being stored on-chip, or off-chip but inside the camera system. (2) In some embodiments, color crosstalk coefficient estimation is performed by software running on a CPU inside the camera 180, which may be on another IC separate from the sensor chip, as shown in FIG. 3B. (3) In some embodiments, color crosstalk coefficient estimation is performed by hard-wired digital logic circuits on-chip of the sensor (e.g., if the SoC sensor 100" of FIG. 3A is used).

Figure 5:
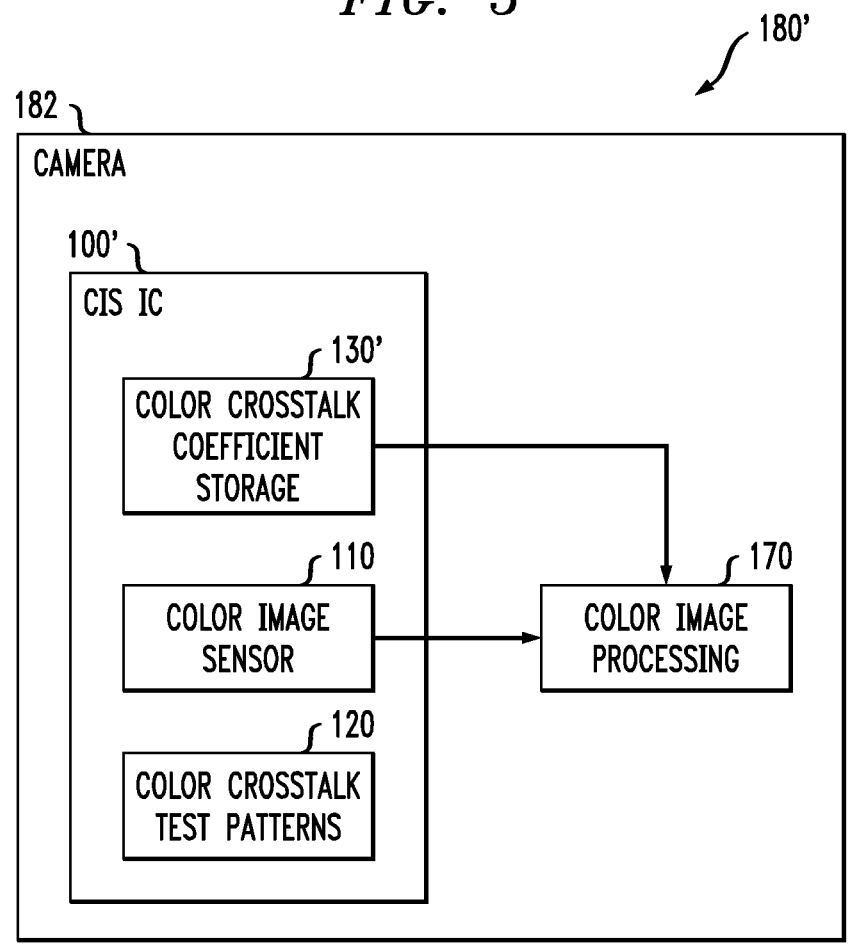
FIG. 5 is a block diagram of a camera including the IC of FIG. 4.

FIG. 5 shows a camera 180' in which the IC 100' containing the color image sensor array 110, the test patterns 120 and the color crosstalk correction coefficient storage device 130' are installed. The digital camera 180' comprises a housing 182 containing the integrated circuit 100. A storage device 130' within the housing 182 stores a plurality of color crosstalk correction coefficients that are based on output signals from the at least one crosstalk test pattern. A color image processing circuit 170 including a crosstalk correction circuit 202 (FIG. 6) is provided within the housing 182 for receiving color image data from the color image sensor array 110. The color image processing circuit 170 uses the color crosstalk coefficients to perform color crosstalk corrections.

Figure 6:
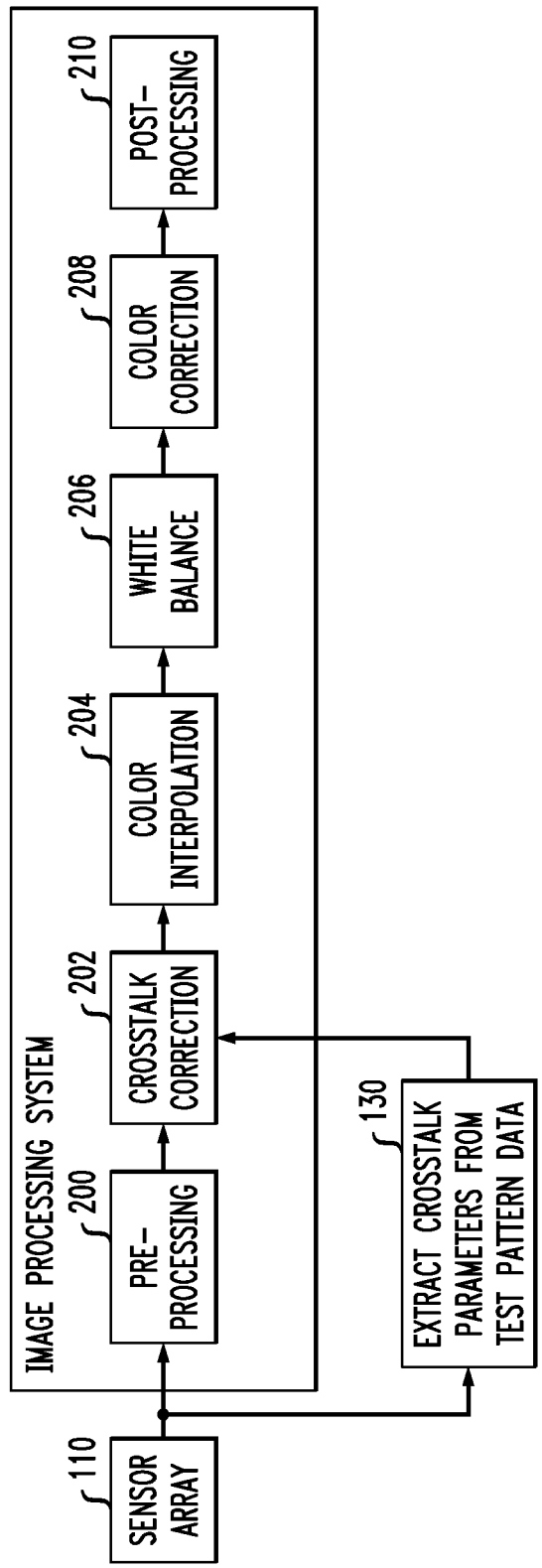
FIG. 6 is a block diagram of an image processing system including color crosstalk correction.

FIG. 6 is a block diagram of the image processing system 170 in the cameras of FIGS. 3 and 5. The inputs to the image processor 170 include the image data from the color image sensor array 110 and the color crosstalk correction coefficients from the color correction coefficient storage device 130.

Block 200 includes image pre-processing. This may include, for example, correction of column fixed pattern noise (FPN) or pixel level FPN, correction for defective pixels, dark current correction, or the like. Additional examples of pre-processing may include: linearization to correct the non-linearity of the raw sensor response; de-noising circuit to reduce temporal noises; lens-shading correction to correct the non-uniform effects caused by global lens, or any combination of these pre-processing operations.

Block 202 includes applying the color crosstalk correction coefficients from the color correction coefficient storage device 130 to correct the signal levels of the various pixels to remove the crosstalk effects. In some embodiments, this color crosstalk correction step is applied separately from color correction. For example, the crosstalk correction on one pixel uses the data from neighboring pixels, as discussed herein. Since the video stream comes in continuously, line buffers (SRAM) save the data of a few previous lines for this purpose. In contrast, color correction may be performed using the RGB data of one pixel. The ability to separate color crosstalk correction from color correction permits use of different processing resources and algorithms to improve performance and/or accuracy of the circuits that perform each operation.

Block 204 performs color interpolation. Because each pixel only samples one color (e.g., R, G, o B), color interpolation calculates the remaining two color values at each pixel. For example, a red pixel has a measured red value, but the blue and green levels at each red pixel are obtained by color interpolation. In some embodiments, the interpolation algorithms are adaptive. In some embodiments, the particular choice of color interpolation algorithm may depend on the image.

Block 206 performs white balance to correct the red and blue coefficients that combine to generate white. White balance may be performed using a an automatic white balance function that searches for a gray object in the image, by a camera pre-set, or on an image by image basis using custom white balance data collected by the photographer (e.g., by taking a picture of a white object or gray card) at the time the image was collected.

Block 208 performs color correction or enhancement. Color correction affects the image utilizing control over intensities of red, green, blue, gamma (mid tones), shadows (blacks) and highlights (whites). Additional corrections may be used to change luminance, saturation and hue in six colors (red, green, blue, cyan, magenta, yellow). In some embodiments, special digital filters and effects may also be applied to the images. Because the color crosstalk correction is performed by block 202 before the color correction block 208, the color correction block can be focused and optimized for giving the image a desired style or mood.

Block 210 performs post-processing. A variety of post-processing functions may be included for in-camera or in-computer post-processing, such as contrast adjustments, cropping or the like. Other examples of post-processing include, but are not limited to: edge enhancement, Gamma correction for display, subsampling for preview, color space conversion, for example, converting {R, G, B} to {Y, Cb, Cr} for JPEG, MPEG, motion-JPEG compression; 444-to-422 down sampling.

FIGS. 7-21 show a variety of test patterns which may be used. In FIGS. 7-21, individual pixels are indicated by squares having the letters R, G, or B. For brevity, the drawings do not show every possible permutation of colors. Rather, an exemplary pattern is shown. The letters R, G and B are considered to represent first, second and third colors in a color space, such as RGB or CMY. In a single-color pattern (FIG. 7), the R pixels may be replaced with G or B pixels. For the two-color patterns of FIGS. 8-19, R-G may be replaced with G-R, R-B, B-R, B-G, G-B, C-M, M-C, C-Y, Y-C, M-Y or Y-M. R-B may be replaced with B-R, R-G, G-R, B-G, G-B, C-M, M-C, C-Y, Y-C, M-Y or Y-M; and G-B may be replaced with G-R, R-B, B-R, R-G, G-R, C-M, M-C, C-Y, Y-C, M-Y or Y-M. Similarly, in the three-color patterns of FIGS. 20 and 21, RGB can be replaced with CMY. In other embodiments, a "W" (white, or clear) pixel may also be used in the color filter array, as discussed below with reference to FIGS. 26A-26F.

Also, the examples of FIGS. 7-21 show 8×8 test patterns. The test patterns can be other sizes. Larger test patterns permit experimentation with higher order color crosstalk effects. Smaller patterns use less space and allow smaller overall chip footprint.

Whereas FIGS. 1-5 refer to test patterns 120 generally, FIGS. 7-21 refer to specific examples of test patterns 70, 72, 74, 76, 78, 80, 82, 84, 86, 88, 90, 92, 94, 96, 98. These specific test patterns may be substituted in the locations where FIGS. 1-5 show test patterns 120.

FIG. 7 shows a test pattern 70 of pixels of uniform color proximate the color image sensor array for measuring pixel color response in the absence of color crosstalk. For example, the pixels in the center region of the mini array are surrounded by pixels of the same colors; therefore, the crosstalk among neighboring pixels cancel with each other under uniform illumination. These can be called reference color pixels. Although red pixels are shown, a complete set of monochrome patterns for the RGB color space further includes a pattern of green pixels and a pattern of blue pixels. Alternatively, in a CMY color space embodiment, three monochrome test patterns of cyan, magenta and yellow pixels are provided. Alternatively, other color spaces (such as WRGB, Kodak Truesense pattern, etc.) may be used, such as those in FIGS. 26A-26F.

FIGS. 8-21 show a plurality of color crosstalk test patterns, each test pattern including: one or more pixels of a first color in a first arrangement; and a plurality of neighboring pixels around the first arrangement, where the neighboring pixels are different in color from the first color.

Figure 8:
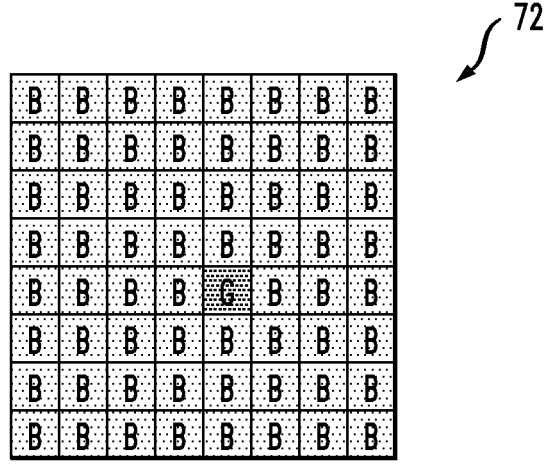
FIG. 8 is a diagram of a test pattern having a single pixel of a first color surrounded by a second color.

FIG. 8 shows a test pattern 72 in which a single pixel of a first color is surrounded by pixels of a second color (different from the first color) filling the remainder of the test pattern. FIG. 8 shows a single green pixel within a field of blue pixels. Similar patterns are provided for a blue pixel surrounded by green pixels, a green pixel surrounded by red, a red pixel surrounded by green, a red pixel surrounded by blue and a blue pixel surrounded by red.

Figures 9, 10, 11, 12:
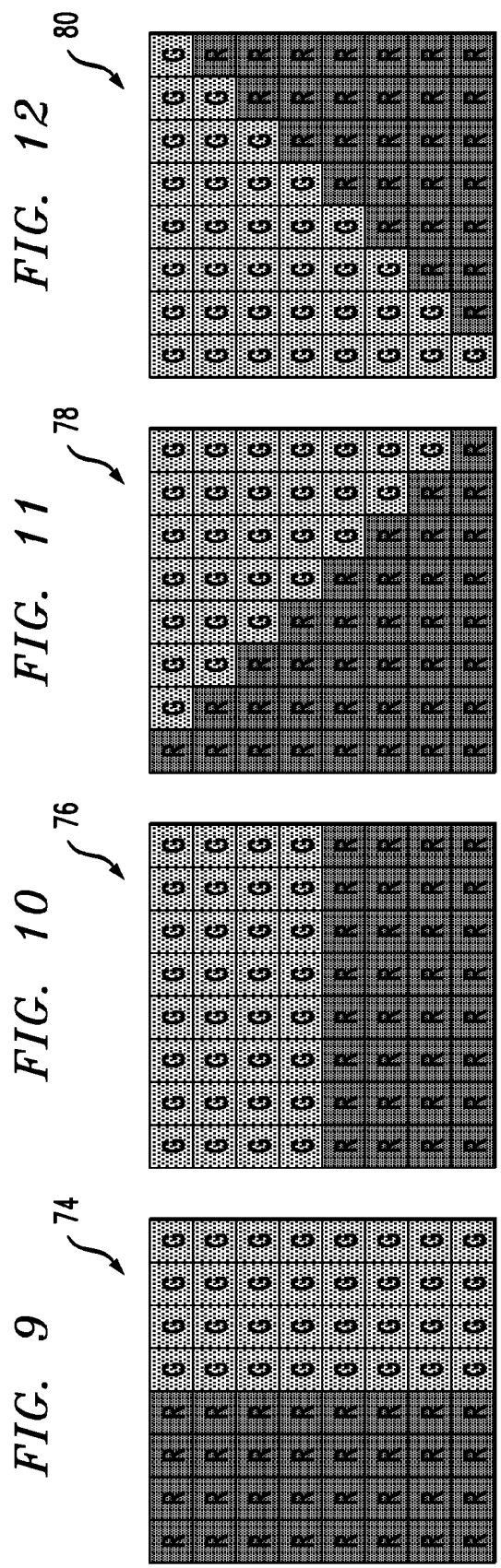
FIGS. 9 to 12 are diagrams of test patterns having two colors, with vertical, horizontal, and diagonal interfaces.

FIGS. 9-12 show four patters in which a first color of pixel fills one side of the test pattern, and a second color fills the other side of the test pattern. These figures include a horizontal interface (FIG. 9) between rectangular regions of different color; a vertical interface (FIG. 10) between rectangular regions of different color; and a diagonal interface between substantially triangular or trapezoidal regions of different color (FIGS. 11 and 12).

In FIG. 9, the left half of the test pattern 74 is occupied by red pixels, and the right half is occupied by green pixels.

In FIG. 10, the bottom half of the test pattern 76 is occupied by red pixels, and the top half is occupied by green pixels.

In FIG. 11, the bottom-left half of the test pattern 78 is occupied by red pixels, and the top-right half is occupied by green pixels.

In FIG. 12, the top-left half of the test pattern 80 is occupied by red pixels, and the bottom-right half is occupied by green pixels.

As noted above, the use of red and green in FIGS. 9-12 is exemplary, and each of the four patterns is representative of six different combinations of two colors from the group consisting of red, green and blue. In other embodiments, each of FIGS. 9-12 represents six different combinations of cyan, magenta and yellow pixels. Thus, FIGS. 9-12 represent 24 different test patterns.

FIGS. 13-16 show exemplary patterns 82, 84, 86 and 88, wherein the plurality of unique crosstalk test patterns include a pattern having a single row (FIG. 13), column (FIG. 14) or diagonal line of pixels (FIGS. 15, 16) of the first color surrounded by pixels of a second color different from the first color.

In FIG. 13, the test pattern 82 includes a single column of red pixels in a test pattern where the remaining pixels are all blue.

In FIG. 14, the test pattern 84 includes a single row of red pixels in a test pattern where the remaining pixels are all blue.

In FIG. 15, the test pattern 86 includes a single diagonal line of red pixels (rising from left to right) in a test pattern where the remaining pixels are all blue.

In FIG. 16, the test pattern 86 includes a single diagonal line of red pixels (falling from left to right) in a test pattern where the remaining pixels are all blue.

Figures 17, 18:
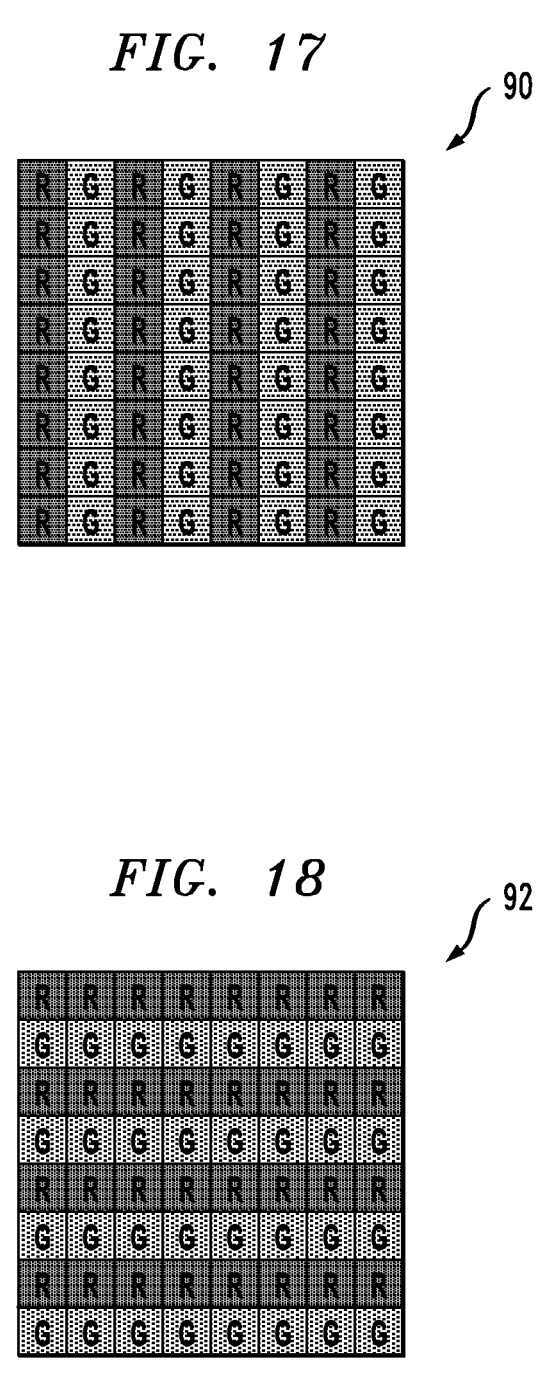

FIGS. 17 and 18 show examples of test patterns 90 and 92, wherein the plurality of unique crosstalk test patterns include a pattern having one of the group consisting of: rows of pixels (FIG. 17) alternating between the first color and a second color different from the first color; and columns of pixels (FIG. 18) alternating between the first color and the second color.

In FIG. 17, the pattern 90 includes alternating columns of red and green.

In FIG. 18, the pattern 92 includes alternating rows of red and green.

Figure 19:
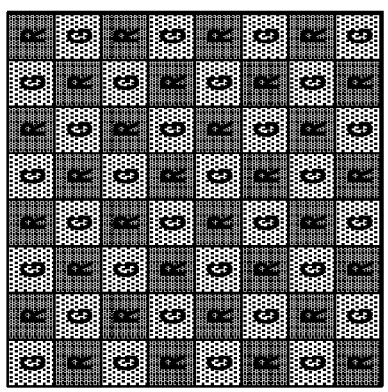
FIG. 19 is a diagram of a checkerboard test pattern.

FIG. 19 shows an example of a pattern 94, wherein the plurality of unique crosstalk test patterns include a checkerboard pattern having first and second colors different from each other. In FIG. 19, the checkerboard comprises alternating red and green pixels.

The use of red and green in FIGS. 13-19 is exemplary, and each of the seven patterns is representative of six different combinations of two colors from the group consisting of red, green and blue. In other embodiments, each of FIGS. 13-19 represents six different combinations of cyan, magenta and yellow pixels.

Figure 21:
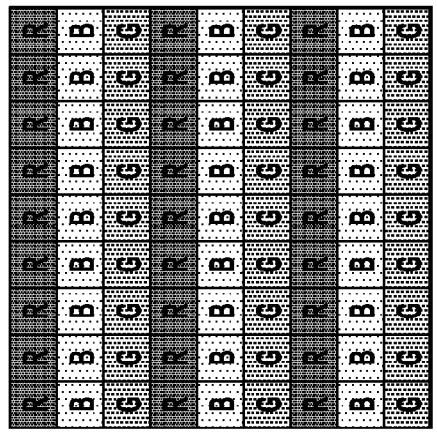
FIGS. 20 and 21 are diagrams of test patterns with three-column sequences and three-row sequences, respectively.
Figure 20:
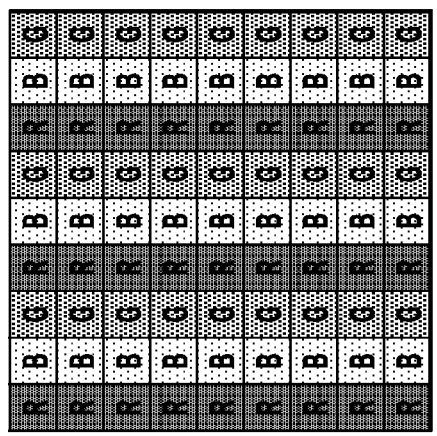

FIGS. 20 and 21 are examples of patterns 96 and 98, wherein the plurality of unique crosstalk test patterns include a pattern having one of the group consisting of: a plurality of sets of pixel rows (FIG. 20), each set including a first row of pixels of the first color, a second row of pixels of a second color different from the first color, and a third row of pixels of a third color different from the first and second colors; or a plurality of sets of pixel columns (FIG. 21), each set including a first column of pixels of the first color, a second column of pixels of the second color, and a third column of pixels of the third color. Although red, blue and green rows or columns are shown, in other embodiments, the rows (or columns) include cyan, magenta and yellow pixels, respectively.

FIGS. 26A-26F show alternative patterns which may be included in the test pattern suite. FIG. 26A shows a "KODAK TRUESENSE" pattern, including R, G, B and W pixels. FIG. 26B shows a variation of the pattern in FIG. 26A. FIG. 26C shows a "SONY CLEARVID" pattern, which uses R, G and B pixels in a different arrangement from the Bayer pattern, with a ratio of 6 green pixels to each red and blue pixel. FIG. 26D shows a TOSHIBA WRGB pattern, which has a different arrangement of R, G, B and W pixels, including equal numbers of R, G, B and W pixels. FIGS. 26E and 26F show alternative test patterns, including two green pixels for each red and blue pixel, and two white pixels for each green pixel.

In various embodiments, the suite of test patterns may include any combination of one or more of these patterns.

A set of 74 test patterns is described above, including three of patterns 70, six each of patterns 72, 74, 76, 78, 80, 82, 84, 86, 88, 90, and 92, three of pattern 94, and one of each pattern 96 and 98. Individual test configurations may include a subset of these 74 test patterns, if satisfactory color crosstalk correction is achieved.

FIGS. 27A and 27B schematically show collection of test data. In FIG. 27A, a green light source 2702 exposes the test pattern 74 to green monochrome light. The test data 2704 show the light values 2706 measured without crosstalk (e.g., using pattern 70, FIG. 7) and the smooth curve 2708 collected from pattern 74, with crosstalk. Similarly, in FIG. 27B, a green light source 2712 exposes the test pattern 74 to red monochrome light. The test data 2714 show the light values 2716 measured without crosstalk (e.g., using pattern 70, FIG. 7) and the smooth curve 2718 collected from pattern 74, with crosstalk. Although FIGS. 27A and 27B show the light radiating in many directions (which would increase color crosstalk), the light may be all perpendicular to the test patterns 70, 74, to minimize the color crosstalk during testing. Alternatively, both perpendicular and non-perpendicular light may be used.

Figure 22:
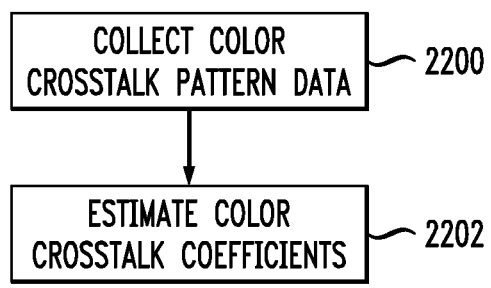
FIG. 22 is a flow chart of a method for estimating color crosstalk coefficients.

FIG. 22 is a flow chart of a method for estimating color coefficients.

At step 2200, color crosstalk test pattern data are collected from at least one test pattern 70, 72, 74, 76, 78, 80, 82, 84, 86, 88, 90, 92, 94, 96, 98 of color sensing pixels on an integrated circuit (IC) 100 having a color image sensor array 110 thereon proximate the at least one test pattern. In some embodiments, the collecting includes collecting color crosstalk test pattern data from a plurality of respectively different color crosstalk test patterns on the same IC as the color image sensor array.

At step 2202, color crosstalk correction coefficients are estimated, based on the crosstalk test pattern data, for correcting spatial spectral crosstalk in color image data to be collected by the color image sensor array. In some embodiments, the color crosstalk test pattern data are exported to a processor 140 external to the camera 180, and the estimated coefficients are programmed into the storage device by the external processor.

In some embodiments, the estimation is performed using the algorithm described above. The above-described coefficient estimation algorithm is only one example. In other embodiments, different models of greater or lesser complexity are used.

For example, in one embodiment, the data (R, Gr, Gb, B) are measured on a test pattern set as described below with reference to FIG. 7, where the crosstalk among neighboring pixels cancel out with each and the data match those under an ideal condition without any crosstalk.

The data (R*, Gr*, Gb*, B*) are measured on the Bayer pattern of the primary pixel array where crosstalk takes place.

The two sets of data are taken under several different light sources, for instance, red, green, and blue light using narrow-band or broad-band filters, or a sequence of narrow-band monochromatic lights sweeping the entire visible spectrum from 400 nm to 740 nm. The crosstalk parameters (ax, ay, d) are to be extracted by least root-mean-square (RMS) fitting of the 2 sets of data, with and without crosstalk.

In some embodiments, the light source(s) 160 is positioned to provide collimated perpendicular light to the test patterns to reduce optical crosstalk during the testing. In other embodiments, the light angle of incidence is varied, to provide additional data regarding the impact of non-perpendicular light on color crosstalk.

If the difference between Gr and Gb is small and can be ignored, that is, ax=ay, the equation can be further simplified to below for parameter extraction.

$$\begin{pmatrix} R^* \\ G^* \\ B^* \end{pmatrix} = \begin{pmatrix} 1-2a-d & 2a & d \\ a & 1-2a & a \\ d & 2a & 1-2a-d \end{pmatrix} \begin{pmatrix} R \\ G \\ B \end{pmatrix}$$

These coefficients are stored in a storage device 130 associated with the digital camera 180 in which the color image sensor array and the storage device are to be installed. In some embodiments, the coefficients are stored in a storage device on the same IC 100 as the color image sensor array 110. In other embodiments, the coefficients are stored in a storage device associated with an external processor.

A color crosstalk correction circuit 202 is coupled to receive the estimated coefficients and the color image data from the color image sensor array 110. The color crosstalk correction circuit 202 is configured to adjust the color image data based on the estimated coefficients.

Figure 23:
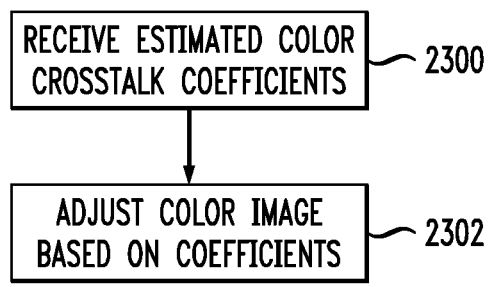
FIG. 23 is a flow chart of a method for adjusting a color image based on the color crosstalk coefficients.

FIG. 23 is a flow chart of a method of performing color crosstalk correction.

At step 2300, estimated color crosstalk coefficients associated with an integrated circuit (IC) are received, where the estimated color crosstalk coefficients are based on crosstalk test pattern data collected by a test pattern of color pixels proximate a color image sensor array on the IC.

At step 2302, a color image collected by the color image sensor array is adjusted, using the estimated color crosstalk coefficients. In some embodiments, the adjusting step is performed by a digital camera, and the estimated color crosstalk coefficients are received from a storage device in the digital camera.

Figure 24:
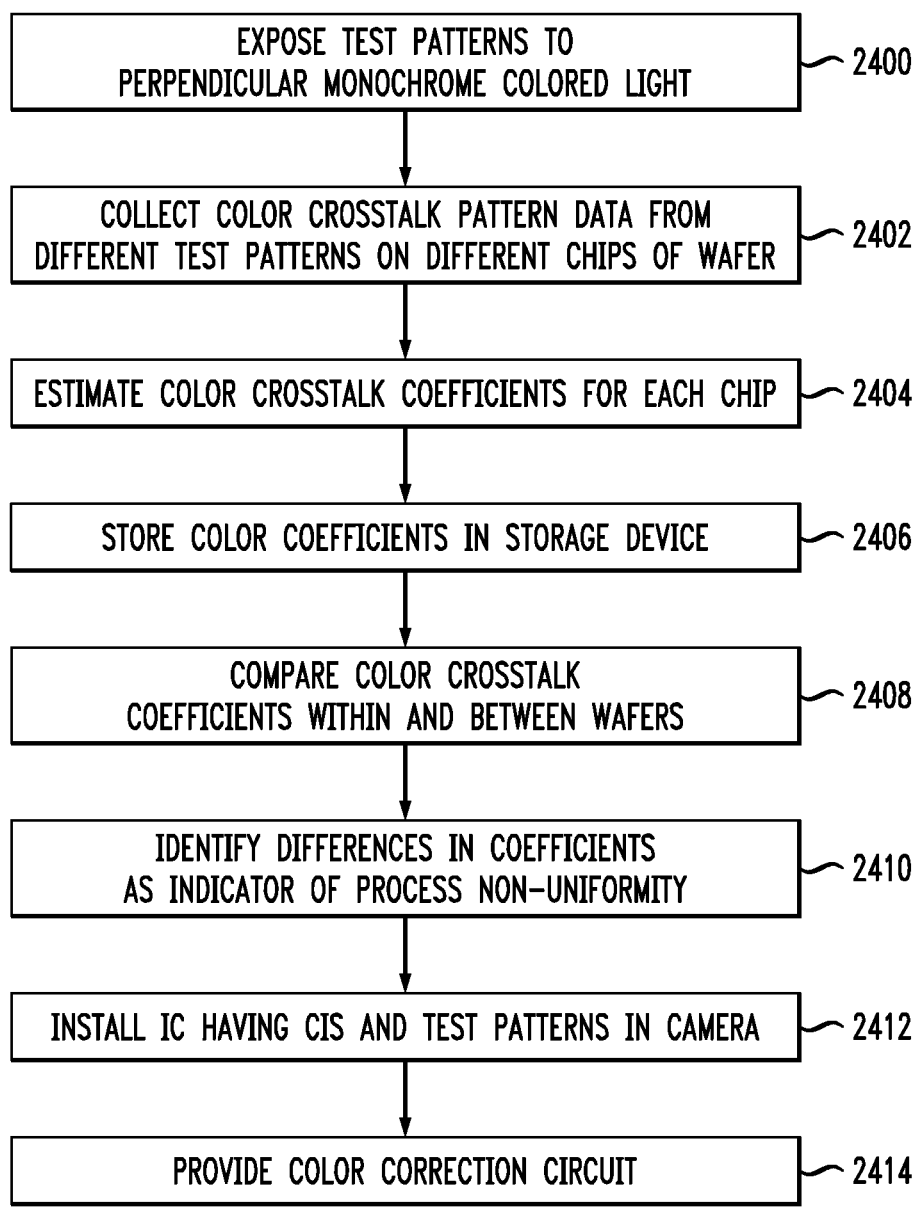
FIG. 24 is a flow chart of a method of collecting data from color crosstalk test patterns to estimate color correction coefficients included in a camera for in-camera crosstalk correction.

FIG. 24 is a flow chart of a method of using the test patterns for a process monitor.

At step 2400, the test patterns 120 are exposed to perpendicular monochrome light at a plurality of different prescribed frequencies.

At step 2402, color crosstalk test pattern data are collected from the plurality of test patterns on a plurality of different IC chips on the wafer (and optionally on multiple wafers).

At step 2404, the color crosstalk coefficients are estimated for each IC.

At step 2406, the coefficients are stored in the storage device associated with the IC 100.

At step 2408, the color crosstalk coefficients from different ICs are compared.

At step 2410, differences in color crosstalk coefficients within and between wafers are identified as indicators of process non-uniformity. Differences in coefficients between chips on the same wafer is an indication of a spatial non-uniformity of a recipe parameter (e.g., temperature, pressure, bias voltage, mass flow rate, etc.) at a given point in time. Differences in coefficients between wafers indicate a drift of a process parameter over time.

At step 2412, assuming the IC 100 having the color image sensor array 110 and the color crosstalk test patterns 120 is a good chip, the IC is installed in a camera.

At 2414, a color crosstalk correction circuit is provided to receive image data from the color image sensor array 110 and the color crosstalk correction coefficients from the storage device 130. The color crosstalk correction circuit corrects the image data based on the coefficients, to remove the effects of color crosstalk. In some embodiments, the color crosstalk correction circuit is provided within the camera. In other embodiments, the color crosstalk correction circuit is provided in an external computer. In some embodiments, the color crosstalk correction circuit is provided both within the camera and within an external computer. For example, the camera may permit the user to produce JPEG images within the camera, including a first color crosstalk correction, and/or produce RAW image files that are processed in an external computer, where the external computer applies a second color crosstalk correction that can be the same as or different from the first color crosstalk correction.

A variety of embodiments are described above. In some embodiments, an integrated circuit 100 comprises a semiconductor substrate 102 and a color image sensor array 110 on the substrate. The color image sensor array 110 has a first configuration of color pixels for collecting color image data. At least one crosstalk test pattern 120 is provided on the substrate 102 proximate the color image sensor array 110. The crosstalk test pattern 120 includes a plurality of color sensing pixels arranged for making color crosstalk measurements. The test pattern configuration is different from the first configuration.

In some embodiments, a method comprises: collecting color crosstalk test pattern data from at least one test pattern of color sensing pixels on an integrated circuit (IC) having a color image sensor array thereon proximate the at least one test pattern; and estimating color crosstalk coefficients based on the crosstalk test pattern data, for correcting spatial spectral crosstalk in color image data to be collected by the color image sensor array.

In some embodiments, a method comprises: (a) receiving estimated color crosstalk coefficients associated with an integrated circuit (IC), where the estimated color crosstalk coefficients are based on crosstalk test pattern data collected by a test pattern of color pixels proximate a color image sensor array on the IC; and (b) adjusting a color image collected by the color image sensor array, using the estimated color crosstalk coefficients.

Although the subject matter has been described in terms of exemplary embodiments, it is not limited thereto. Rather, the appended claims should be construed broadly, to include other variants and embodiments, which may be made by those skilled in the art.

What is claimed is:

1. A digital camera comprising:
   a color image sensor array capable of collecting a color image, the color image sensor array having a first configuration of color pixels for collecting color image data;
   one or more respectively different color crosstalk test patterns, each color crosstalk test pattern having a respective configuration that is different from the first configuration for providing signals used to generate color crosstalk correction coefficients; and
   a color crosstalk correction circuit for adjusting the color image collected by the color image sensor array, using the color crosstalk correction coefficients.

2. The digital camera of claim 1, wherein the color image sensor array and the one or more color crosstalk test patterns are proximate to each other on an integrated circuit substrate.

3. The digital camera of claim 2, wherein the integrated circuit includes a storage device for storing the color crosstalk correction coefficients.

4. The digital camera of claim 3, wherein the integrated circuit includes the color crosstalk correction circuit for adjusting the color image.

5. The digital camera of claim 3, wherein the digital camera further comprises:
   a housing containing the integrated circuit; and a color image processing circuit within the housing, the color image processing circuit including the color crosstalk correction circuit for adjusting the color image.

6. The digital camera of claim 2, wherein the color crosstalk test patterns are arranged adjacent at least one edge of the color image sensor array.

7. The digital camera of claim 1, wherein the one or more color crosstalk test patterns includes a plurality of unique crosstalk test patterns, each color crosstalk test pattern including:
- one or more pixels of a first color in a first arrangement;
- a plurality of neighboring pixels around the first arrangement, the neighboring pixels being different in color from the first color.

8. The digital camera of claim 1, further comprising a circuit for estimating the color crosstalk correction coefficients based on output signals from the at least one crosstalk test pattern.

9. The digital camera of claim 1, wherein the digital camera comprises an integrated circuit that contains the color image sensor array and the storage device containing color crosstalk correction coefficients.

10. The digital camera of claim 1, further comprising a storage device containing color crosstalk correction coefficients, wherein the digital camera includes an integrated circuit containing the color image sensor, the storage device and the color crosstalk correction circuit, and the camera is configured to receive the color crosstalk correction coefficients from a processor external to the integrated circuit, and store the received color crosstalk correction coefficient data in the storage device.

11. The digital camera of claim 1, further comprising a color image processor containing the color crosstalk correction circuit for adjusting the color image, the color image processor further comprising:
- an image pre-processing module configured to receive image data from a plurality of imaging elements in a color image sensor and output pre-processed data to the color crosstalk correction circuit;
- a color interpolation module coupled to receive data from the color crosstalk correction module;
- a white balance correction module coupled to the color interpolation module; and
- a color correction module coupled to the white balance correction module.

12. The digital camera of claim 11, wherein, the pre-processing module is configured to perform at least one of the group consisting of fixed pattern noise correction, correction of defective pixels, or dark current correction, before providing the image data to the color crosstalk correction circuit.

13. A color image processor, comprising:
- an image pre-processing module configured to receive image data from a plurality of imaging elements in a color image sensor and output pre-processed data, the color image sensor array having a first configuration of color sensors for collecting color image data; and
- a color crosstalk correction circuit for correcting color crosstalk between neighboring imaging elements of different colors from each other in the pre-processed data, using color crosstalk correction coefficients based on signals output by one or more respectively different color crosstalk test patterns having respective configurations that are different from the first configuration.

14. The color image processor of claim 13, wherein the color crosstalk correction circuit is configured to receive the color crosstalk correction coefficients from a storage device associated with the color image sensor, and to apply the color crosstalk correction coefficients when correcting the color crosstalk.

15. The color image processor of claim 13, wherein the color crosstalk correction circuit is configured to apply a first order color crosstalk correction algorithm to the image data.

16. The color image processor of claim 13, further comprising:
- a color interpolation module coupled to receive data from the color crosstalk correction circuit;
- a white balance correction module coupled to the color interpolation module; and
- a color correction module coupled to the white balance correction module.

17. The color image processor of claim 13, further comprising a circuit for estimating color crosstalk correction coefficients based on output signals from the at least one crosstalk test pattern.

18. An integrated circuit, comprising:
- a color image sensor array having a first configuration of color sensors for collecting color image data; and
- one or more respectively different color crosstalk test patterns proximate the color image sensor array and having respective configurations that are different from the first configuration.

19. The integrated circuit of claim 18, further comprising a storage device encoded with color crosstalk correction coefficients to be applied for correcting color crosstalk in image data collected by the color image sensor array.

20. The integrated circuit of claim 19, further comprising a color image processor for processing the color image data, the color image processor configured to apply the crosstalk correction coefficients for correcting the color crosstalk in the image data collected by the color image sensor array.

* * * * *

UNITED STATES PATENT AND TRADEMARK OFFICE
CERTIFICATE OF CORRECTION

| | | |
|---|---|---|
| PATENT NO. | : 8,767,100 B2 | Page 1 of 1 |
| APPLICATION NO. | : 13/723262 | |
| DATED | : July 1, 2014 | |
| INVENTOR(S) | : Calvin Yi-Ping Chao et al. | |

It is certified that error appears in the above-identified patent and that said Letters Patent is hereby corrected as shown below:

Title Page:

Item (72) Inventors: First named inventor's family name is misspelled as "Chen". The correct spelling is "Chao".

Signed and Sealed this
Fourteenth Day of October, 2014

Michelle K. Lee
*Deputy Director of the United States Patent and Trademark Office*